(12) United States Patent
Sanchez et al.

(10) Patent No.: US 10,950,151 B2
(45) Date of Patent: Mar. 16, 2021

(54) SMART SCREEN FOR CITIZEN INTERACTIONS AND COMMUNICATIONS

(71) Applicant: Color Vision, S.A., San Jose (CR)

(72) Inventors: Jorge Sanchez Sanchez, San Jose (CR); Flor de Maria Montero Paniagua, San Jose (CR)

(73) Assignee: COLOR VISION S.A., San Jose (CR)

( * ) Notice: Subject to any disclaimer, the term of this patent is extended or adjusted under 35 U.S.C. 154(b) by 0 days.

(21) Appl. No.: 16/433,441

(22) Filed: Jun. 6, 2019

(65) Prior Publication Data
US 2020/0020258 A1    Jan. 16, 2020

(30) Foreign Application Priority Data

Jul. 10, 2018    (CR) .............................. 2018-0000354

(51) Int. Cl.
| | |
|---|---|
| *G08B 7/00* | (2006.01) |
| *G09F 27/00* | (2006.01) |
| *G09F 13/22* | (2006.01) |
| *G09F 13/04* | (2006.01) |
| *G06K 9/00* | (2006.01) |

(52) U.S. Cl.
CPC ....... *G09F 27/004* (2013.01); *G06K 9/00201* (2013.01); *G09F 13/0413* (2013.01); *G09F 13/22* (2013.01); *G09F 27/005* (2013.01); *G09F 2013/0431* (2013.01); *G09F 2013/0445* (2013.01); *G09F 2013/222* (2013.01); *G09F 2027/001* (2013.01)

(58) Field of Classification Search
CPC . G06K 9/00201; G09F 13/0413; G09F 13/22; G09F 2013/0431; G09F 2013/0445; G09F 2013/222; G09F 2027/001; G09F 27/004; G09F 27/005
USPC ...................................... 340/691.6
See application file for complete search history.

(56) References Cited

U.S. PATENT DOCUMENTS

| | | | | |
|---|---|---|---|---|
| 2001/0034960 | A1* | 11/2001 | O'Hanlon ............ | A47G 1/0622 40/714 |
| 2003/0222134 | A1* | 12/2003 | Boyd ................. | G06Q 30/0261 235/375 |
| 2005/0005494 | A1* | 1/2005 | Way ..................... | A47G 1/0622 40/714 |
| 2006/0187140 | A1* | 8/2006 | Brask .................... | G06F 1/1601 345/1.1 |
| 2009/0262189 | A1* | 10/2009 | Marman .......... | G08B 13/19613 348/143 |
| 2009/0267759 | A1* | 10/2009 | Lu .......................... | H04L 67/36 340/539.22 |
| 2013/0100149 | A1* | 4/2013 | Dysart ..................... | G09F 9/33 345/531 |

(Continued)

*Primary Examiner* — Naomi J Small
(74) *Attorney, Agent, or Firm* — Bay State IP, LLC

(57) ABSTRACT

The intention is to present the Smart Screen for Citizen Communication to the market as a solution to the need for direct access to a series of goods and services that today require a high level of planning or that are difficult to access due to their high cost. For that purpose, the device comprises an LED screen with a series of accessories that together create a mass communication station that permits sharing of information and advertising and incorporates an audio-video system for citizen safety, Wi-Fi, an emergency light, and other services provided by the systems incorporated into the device.

9 Claims, 4 Drawing Sheets

(56) References Cited

U.S. PATENT DOCUMENTS

| | | | |
|---|---|---|---|
| 2013/0170700 A1* | 7/2013 | Yang | G06K 9/00228 382/103 |
| 2014/0139539 A1* | 5/2014 | Byers | G09G 5/10 345/589 |
| 2014/0172557 A1* | 6/2014 | Eden | G06F 3/0488 705/14.49 |
| 2015/0207963 A1* | 7/2015 | Sayag | H04M 1/72527 348/376 |
| 2016/0155334 A1* | 6/2016 | Jansson | G08G 1/08 340/906 |
| 2017/0310956 A1* | 10/2017 | Perdices-Gonzalez | G09G 3/348 |
| 2018/0047056 A1* | 2/2018 | Kim | G06Q 30/0266 |
| 2018/0115772 A1* | 4/2018 | Thompson | H04N 13/368 |
| 2018/0232770 A1* | 8/2018 | Miller | G06Q 30/0269 |
| 2019/0028696 A1* | 1/2019 | Dietz | H04N 13/327 |
| 2019/0095959 A1* | 3/2019 | Yu | G06Q 30/0276 |

* cited by examiner

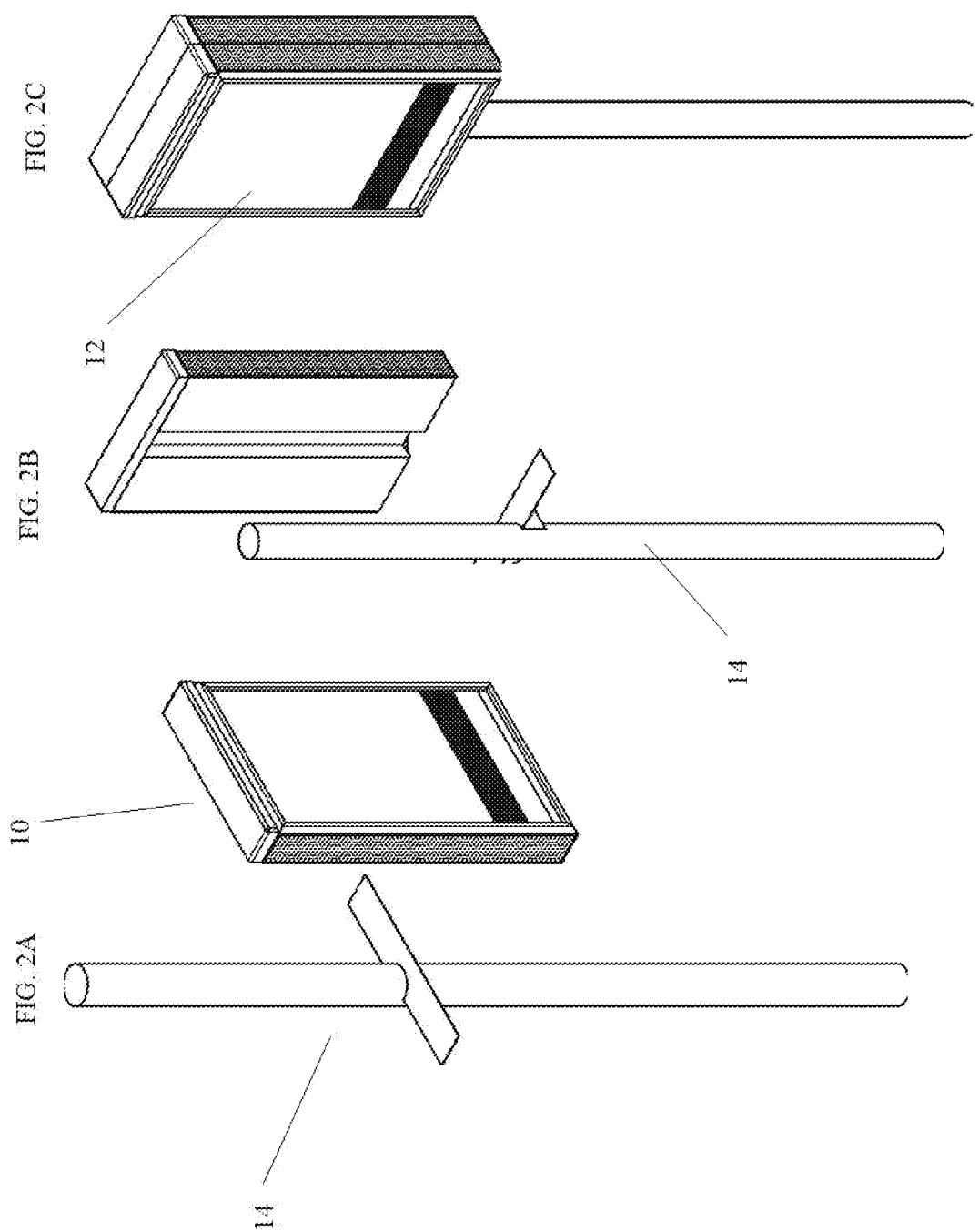

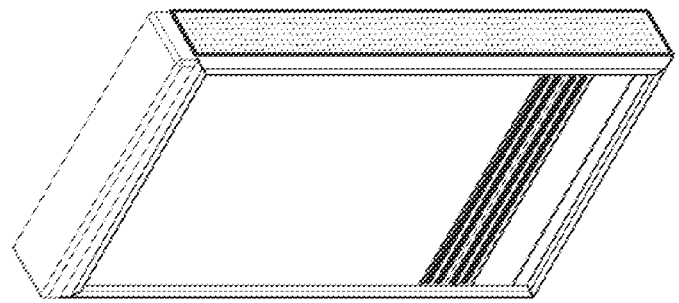
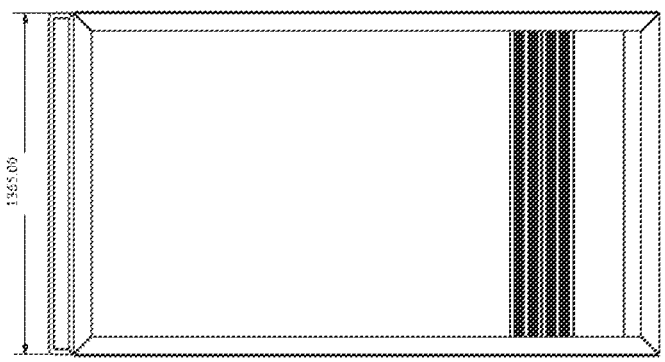
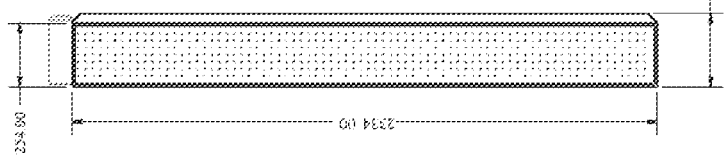
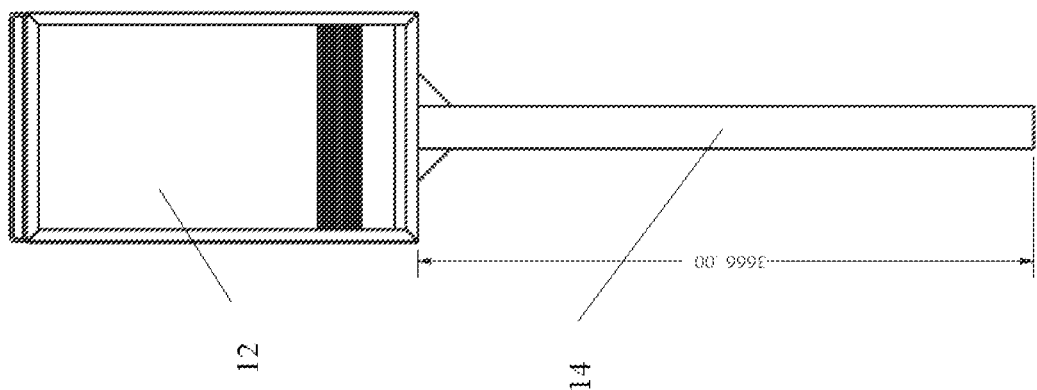
FIG. 3D
FIG. 3C
FIG. 3B
FIG. 3A

SMART SCREEN FOR CITIZEN INTERACTIONS AND COMMUNICATIONS

CROSS REFERENCE TO RELATED APPLICATION

This application takes priority from and claims the benefit of Costa Rican Patent Application No. 2018-000354 filed on Jul. 10, 2018, the contents of which are herein incorporated by reference.

BACKGROUND OF THE INVENTION

Field of the Invention

This device is intended for use within the communications technology sector in areas with mass circulation of people. It consists of a display with updated hardware and software intended for widespread and synchronized use in order to incorporate cities into the "smart city" concept. Its purpose is to provide the community with services in different fields, including communication, safety, health, information, and others.

Description of the Related Art

Notable known or public prior art for the invention includes: LED displays for image projection, video recorders, GPS radars, Wi-Fi for sending information wirelessly and Internet access, and speakers for sound emission.

The immediate precursor to this invention is the utility model pending registration under file number 2018-000116. This model is currently in the opposition phase and was presented by the same company (Color Visión, S.A.) on Feb. 23, 2018.

Utility model 2018-000116 consists of a metal kiosk that can be affixed to a post to work in coordination with a screen. The kiosk's purpose is to provide a variety of user services, such as a recharging station for electric vehicles and bicycles, CPR, a handset for emergency calls, a blood pressure monitor with folding chair, etc.

The direct precursor contained in utility model 2018-000116 is in essence the screen. As seen in the technical document attached to this application, the screen integrates the following elements: LED display in color and black and white, speed radar, public Wi-Fi, emergency light, emergency siren, and safety camera with face and object recognition.

The disadvantage inherent in utility model 2018-000116 and that this application intends to solve is the need for independent operation. The previous model consists of a union between the kiosk attached to the post and the screen, which operate in conjunction. The purpose of the present application is to present a screen that operates independently and that can be affixed to a post or any other surface.

SUMMARY OF THE INVENTION

The invention provides a solution to the most important problem in the field of citizen communication: a lack of technological elements that share relevant information with citizens in areas where it is needed most. The display is intended to share a variety of information that is relevant to citizens in the areas where they circulate on a daily basis. To this effect, the display is designed so that the information stored is varied and accessible to all citizens.

The object of the invention is an electronic smart screen for citizen communication. The intention is to incorporate the largest number of services into a single device so as to allow or facilitate, through the use of technology, improving the quality of life of citizens as they circulate through the city's public and private sectors. For that purpose, the intention is to integrate audiovisual media as well as a variety of services to facilitate the creation of a user-friendly city.

BRIEF DESCRIPTION OF THE DRAWINGS

FIGS. 2A-2C illustrate the smart screen separated from the framework and also one embodiment where two screens are attached to the framework.

FIGS. 3A-3D illustrate another embodiment of the smart screen, both attached to and separate from the framework in various views.

DETAILED DESCRIPTION OF THE SEVERAL EMBODIMENTS

The LED display described in the present application proposes an innovation in the field of outdoor communication. By incorporating different devices and systems into the LED display, it is intended to function as a connection between the user, the city, and different interacting entities.

The display contains Internet access devices, cameras with recognition and recording systems, speed radar, and an integration system for synchronized screen management. The purpose is for both the public and private sectors to take advantage of the screen's benefits to improve their communication with and understanding of citizens. In turn, the screens are intended to benefit citizens by providing required information wherever they are located in the city. As previously stated, the intention is for the screen to function as an access device in order to convert the city into a smart city.

Figure 1A:
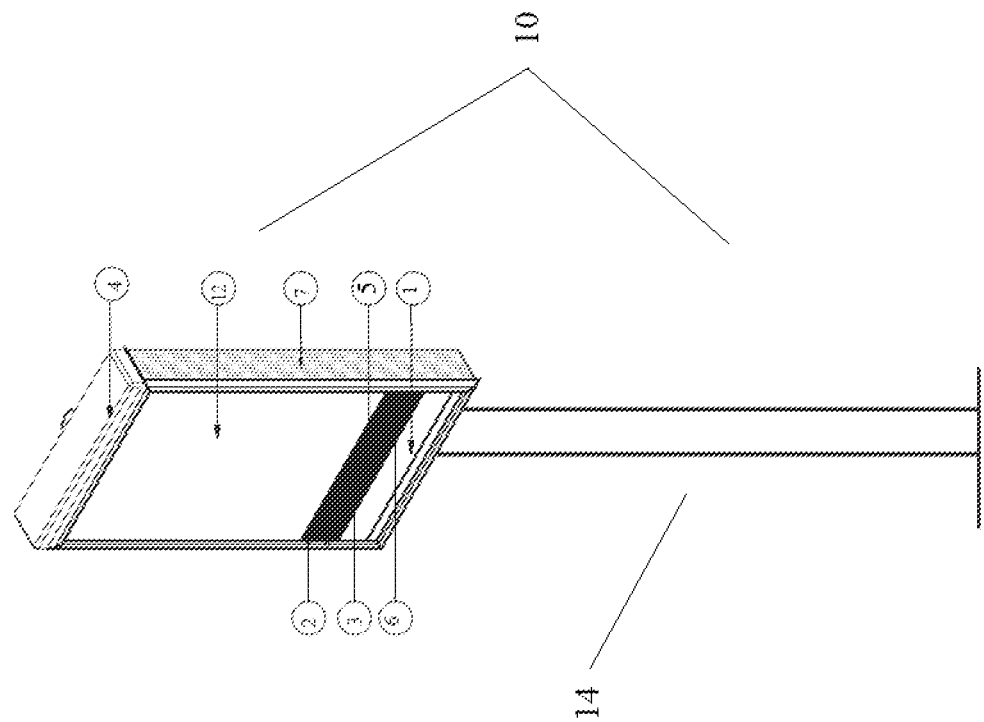
FIGS. 1A-1C illustrate a side, front and perspective views of the smart screen set on a framework.
Figure 1B:
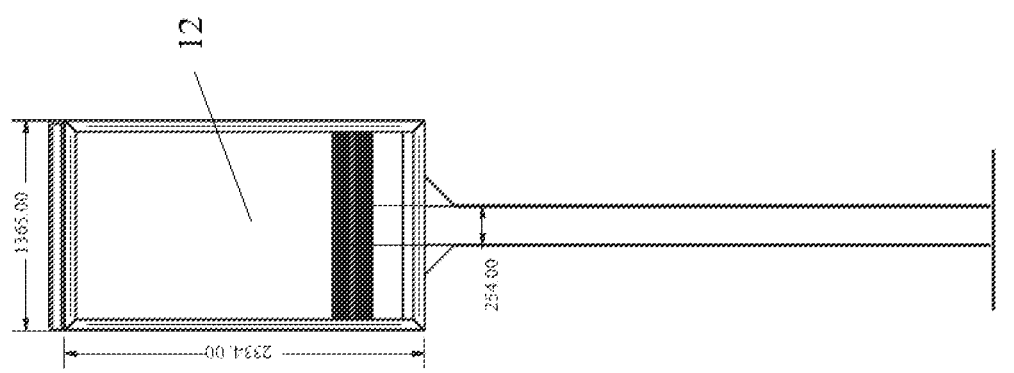
Figure 1C:
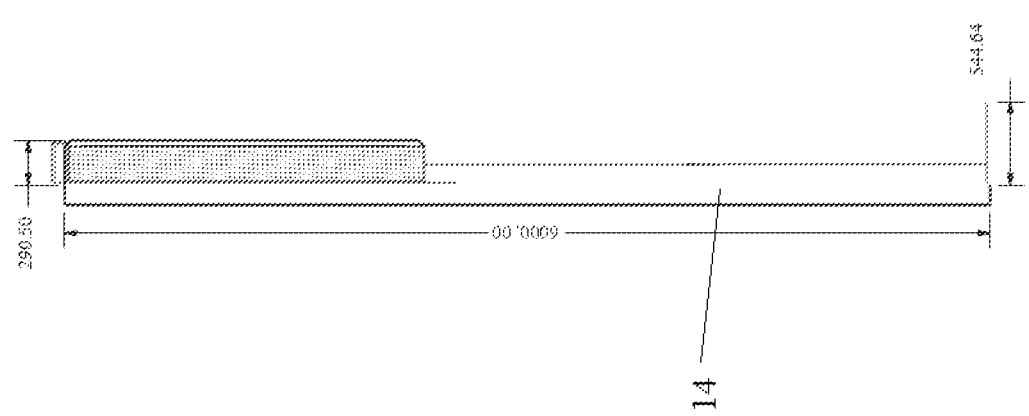

FIGS. 1A-1C illustrate one embodiment of a smart screen 10 includes an integrated Light Emitting Diode ("LED") display 12, wherein the LED display 12 is set on a metal framework 14 that is reinforced against vandalism and the weather for outdoor use. In alternative embodiments, the smart screen may be affixed to a post or other similar surface, both in a horizontal and/or vertical orientation, with a design that integrates a number of simultaneous or asynchronous devices.

The smart screen 10 further comprises a radar device 2, a Wi-Fi emitter 3, an emergency light 4, an emergency siren 5, a safety camera 6 and a plurality of speakers 7. In one embodiment, the safety camera 6 is equipped with facial, license plate, people, vehicle and object recognition. Preferably, the LED display 12 possesses an image projection in color and black and white.

Furthermore, the radar device 2 is configured to detect both vehicle speed and geographic location preferably of an automobile, truck or other similar modes of transportation. Additionally, the Wi-Fi emitter 3 is configured to provide connection to the Internet to computing devices that link to the World Wide Web and to be able to send a variety of information to select databases based on the data captured by the smart screen 10.

Additionally, the emergency light 4 is activated by the illumination of a red light in certain situations that may be deemed dangerous or threatening requiring assistance. In conjunction with the activation of the emergency light 4, the emergency siren 5 will emit an audio alert following activation of the emergency light 4 so that both a visual indicator and audio indicator will be present in potentially dangerous and/or life-threatening situations. In yet another embodiment, the plurality of speakers 7 are configured to be able to transmit various messages to pedestrians and other people in the vicinity of the smart screen 10.

FIGS. 2A-2C illustrate the smart screen 10, wherein the smart screen 10 is separated from the framework 14 prior to be affixed for usage. Additionally, in FIG. 2C, a pair of smart screens 10 are placed on the framework 14 in opposing directions so that there is an LED display 12 on both sides of the framework 14.

FIGS. 3A-3D illustrate yet another embodiment of the smart screen 10 shown in a variety of views both affixed and separate from the framework 14.

Figure 4C:
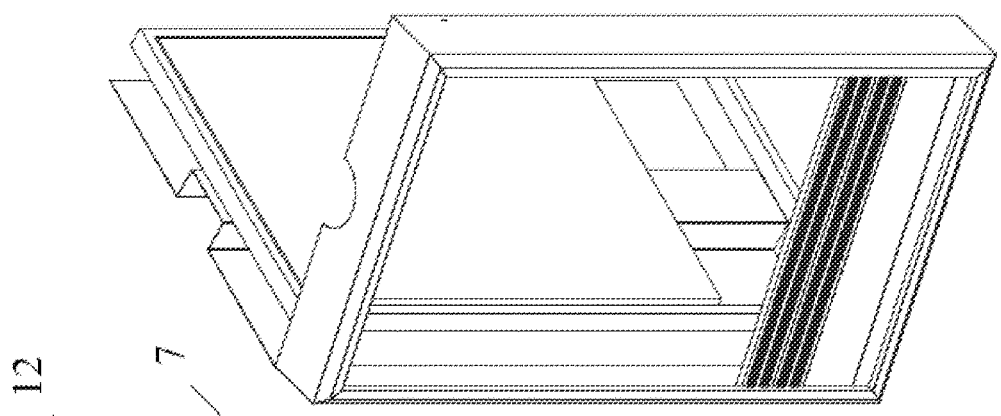
FIGS. 4A-4C illustrate another embodiment of the smart screen with speakers and emergency lights both affixed and separate from a display of the smart screen.
Figure 4B:
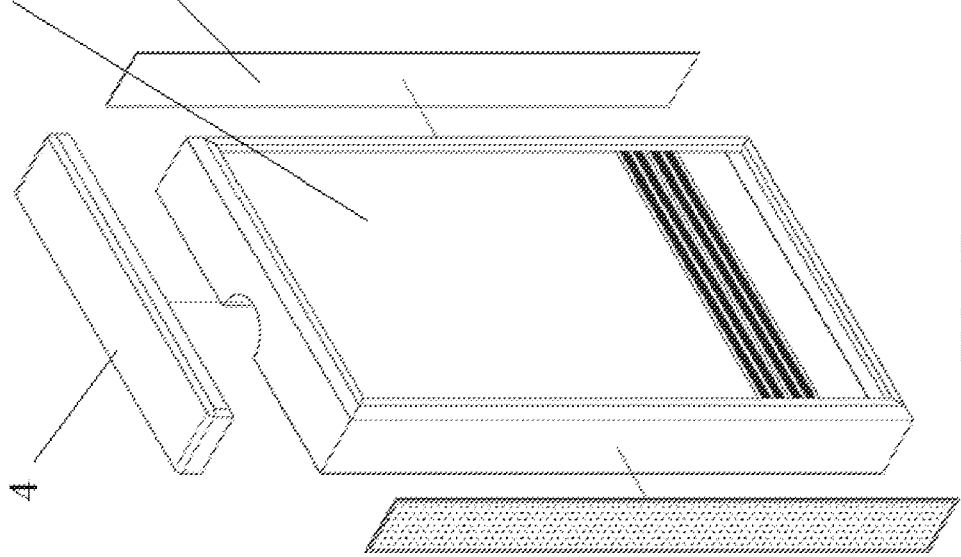
Figure 4A:
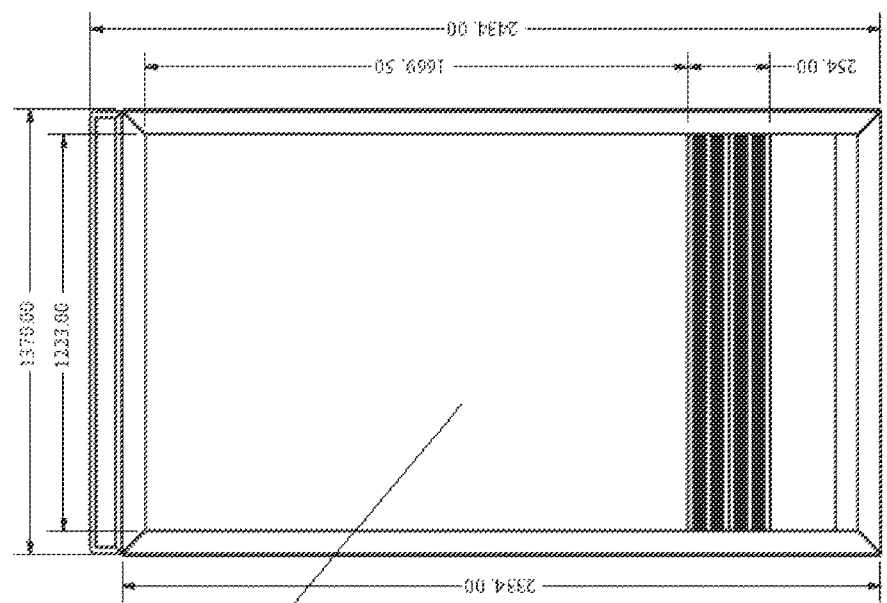

FIGS. 4A-4C illustrate another embodiment of the smart screen 10 wherein the plurality of speakers 7 and the emergency light 4 may be configured as individual parts of the smart screen 10 that are affixed to the LED display 12 as a single unit.

The screen has an approximate height of 2.33 meters (7.65 feet), an approximate length of 1.36 meters (4.45 feet), and an approximate depth of 29.05 centimeters (11.45 inches). The display consists of the following components: LED screen set into a metal framework that is reinforced against vandalism and the weather, built especially for outdoor use, and that can be affixed to or set into any vertical and horizontal surface. Its unique design integrates a number of simultaneous or asynchronous devices, including: megapixel integration for color image projection, speed radar, public Wi-Fi, emergency light, emergency siren, safety camera with face, license plate, people, and vehicle recognition, and a carbon dioxide ($CO_2$) monitor, with the possibility of incorporating other devices as well.

What is claimed is:

1. A smart screen comprising:
an LED display;
a metal framework;
a radar device;
a Wi-Fi emitter;
a carbon dioxide monitor;
an emergency light;
an emergency siren; a safety camera; and
a plurality of speakers;
wherein the emergency light is removably fixed to the LED display.

2. The smart screen of claim 1 wherein the LED display is configured to project images in both color and black and white.

3. The smart screen of claim 1, wherein the metal framework is reinforced against vandalism and the weather, built especially for outdoor use, and affixed to a post or any other vertical or horizontal surface with the flexibility to hold a pair of smart screens in opposing directions so that there is an LED display on both sides of the framework.

4. The smart screen of claim 1 wherein the radar device is configured to detect vehicle speed and geographic location.

5. The smart screen of claim 1 wherein the Wi-Fi emitter is configured to connect a network of devices and to send information to select databases via internet.

6. The smart screen of claim 1 wherein the emergency light activates a red light in select situations.

7. The smart screen of claim 1 wherein the emergency siren is synchronized with the emergency light and emits an audio alert when the emergency light is activated.

8. The smart screen of claim 1 wherein the camera is configured to recognize faces, license plates, people, and any other object.

9. The smart screen of claim 1 wherein the plurality of speakers is configured transmit messages to pedestrians and other persons in the vicinity of the smart screen.

* * * * *